May 9, 1939.  F. K. FILDES  2,157,651
ROAD-RAIL VEHICLE
Filed Dec. 3, 1936  13 Sheets-Sheet 5
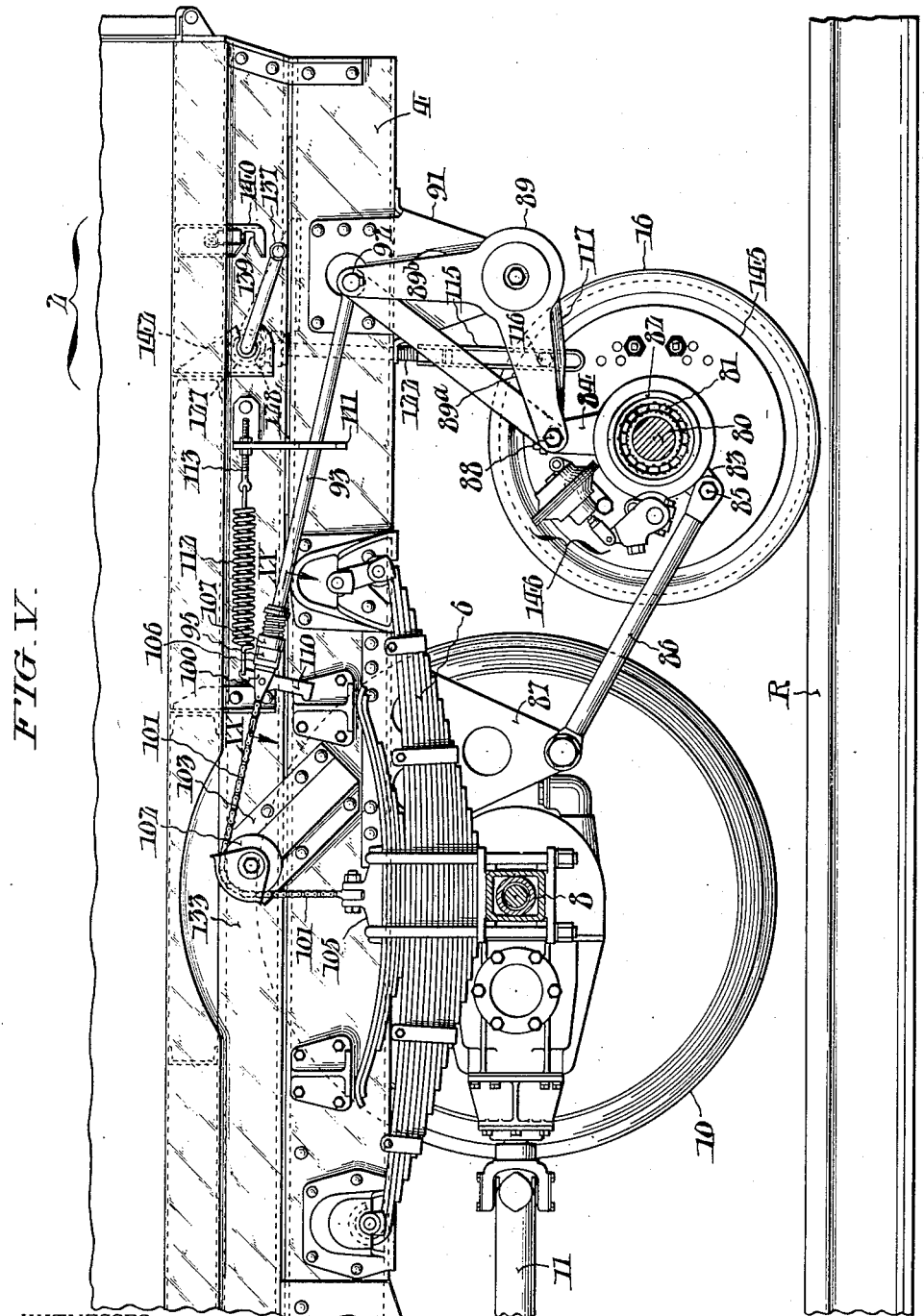

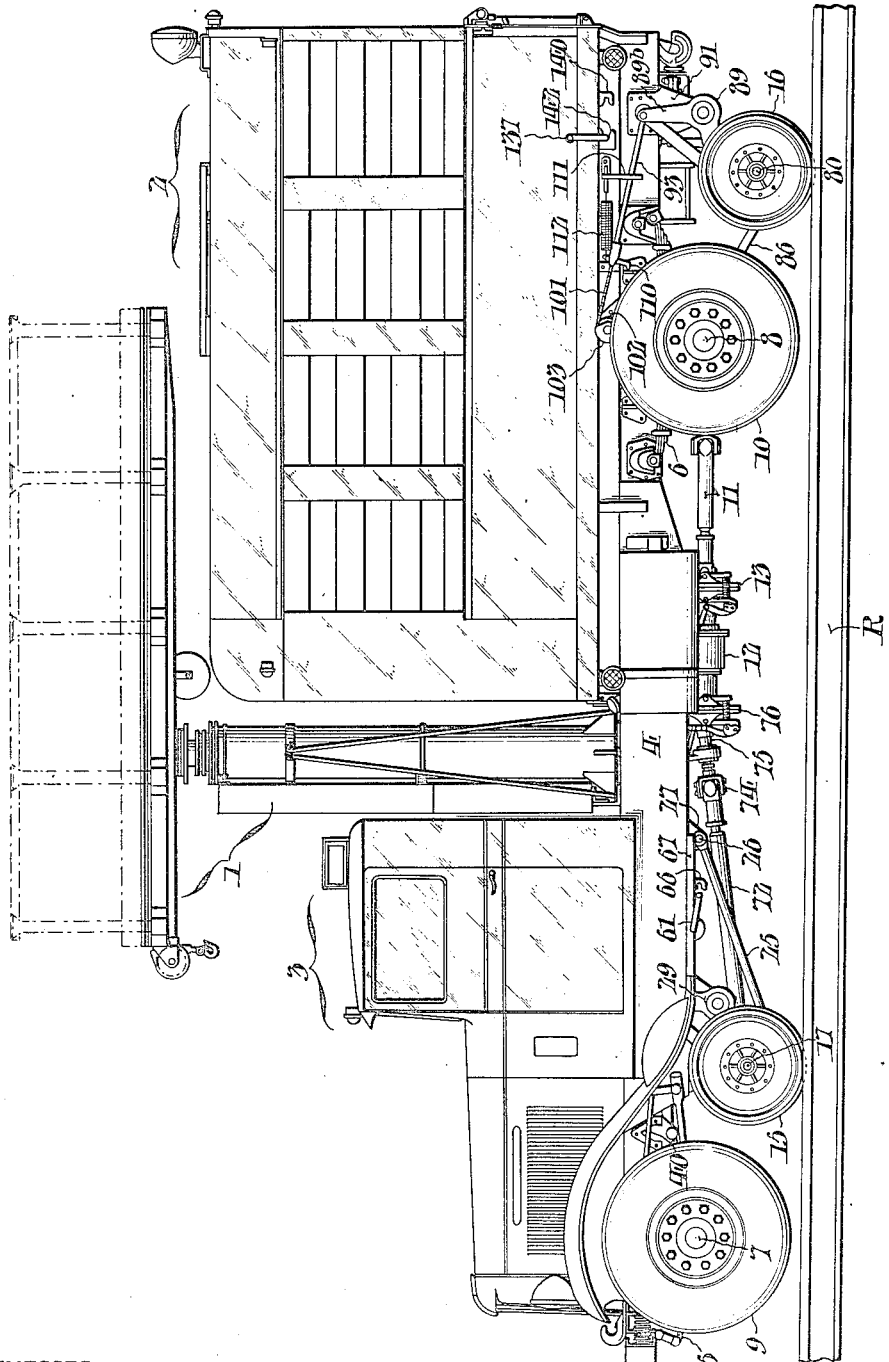

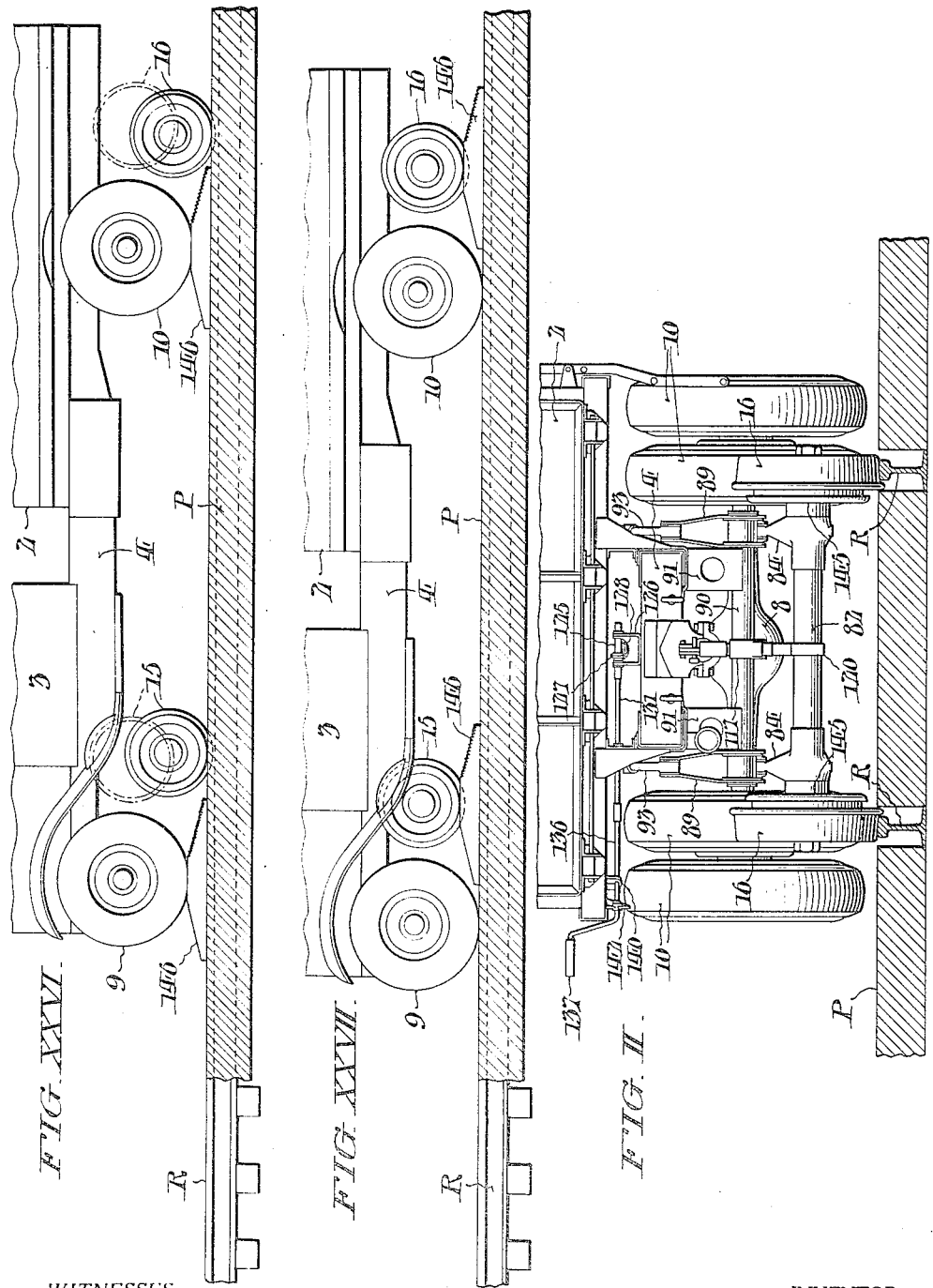

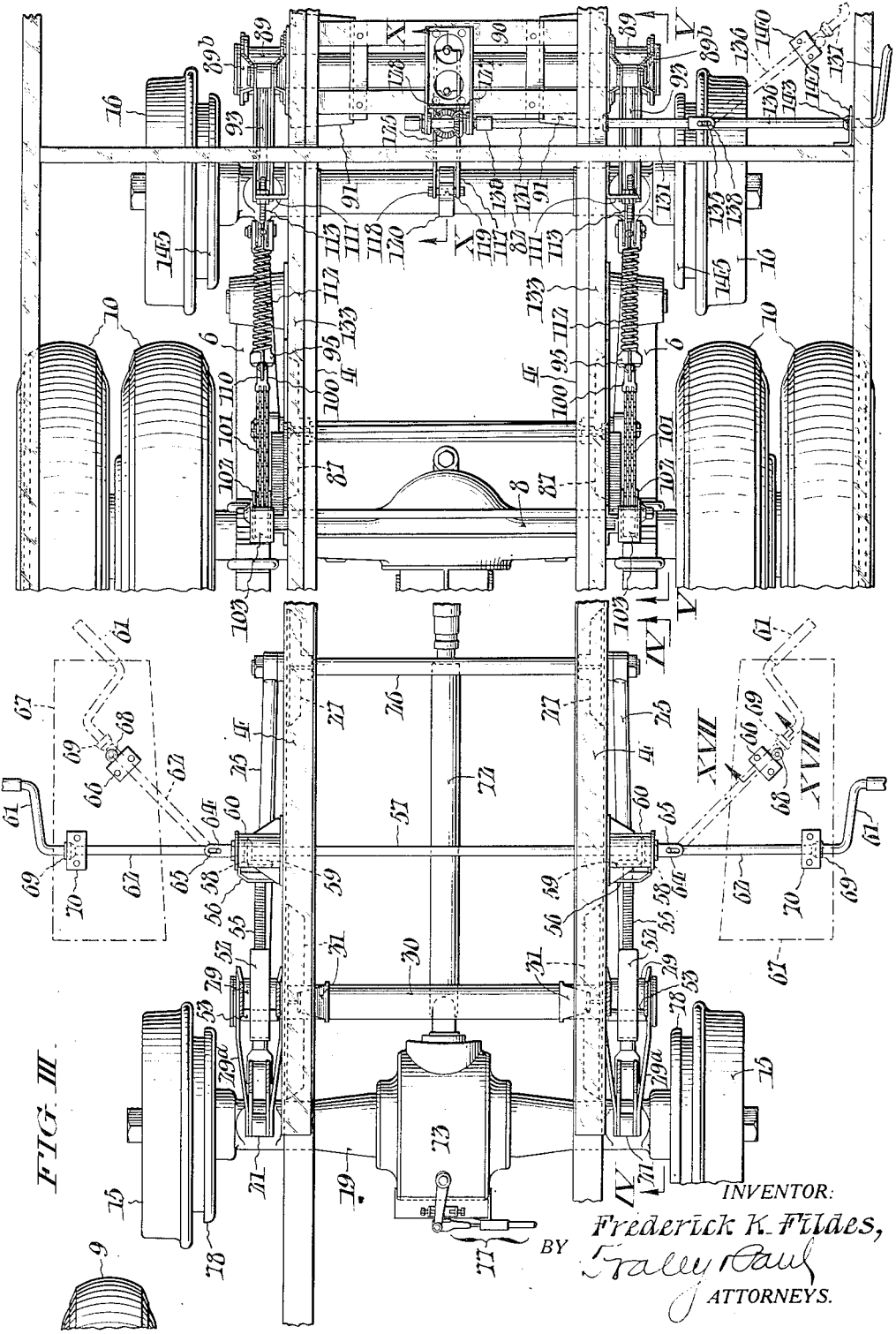

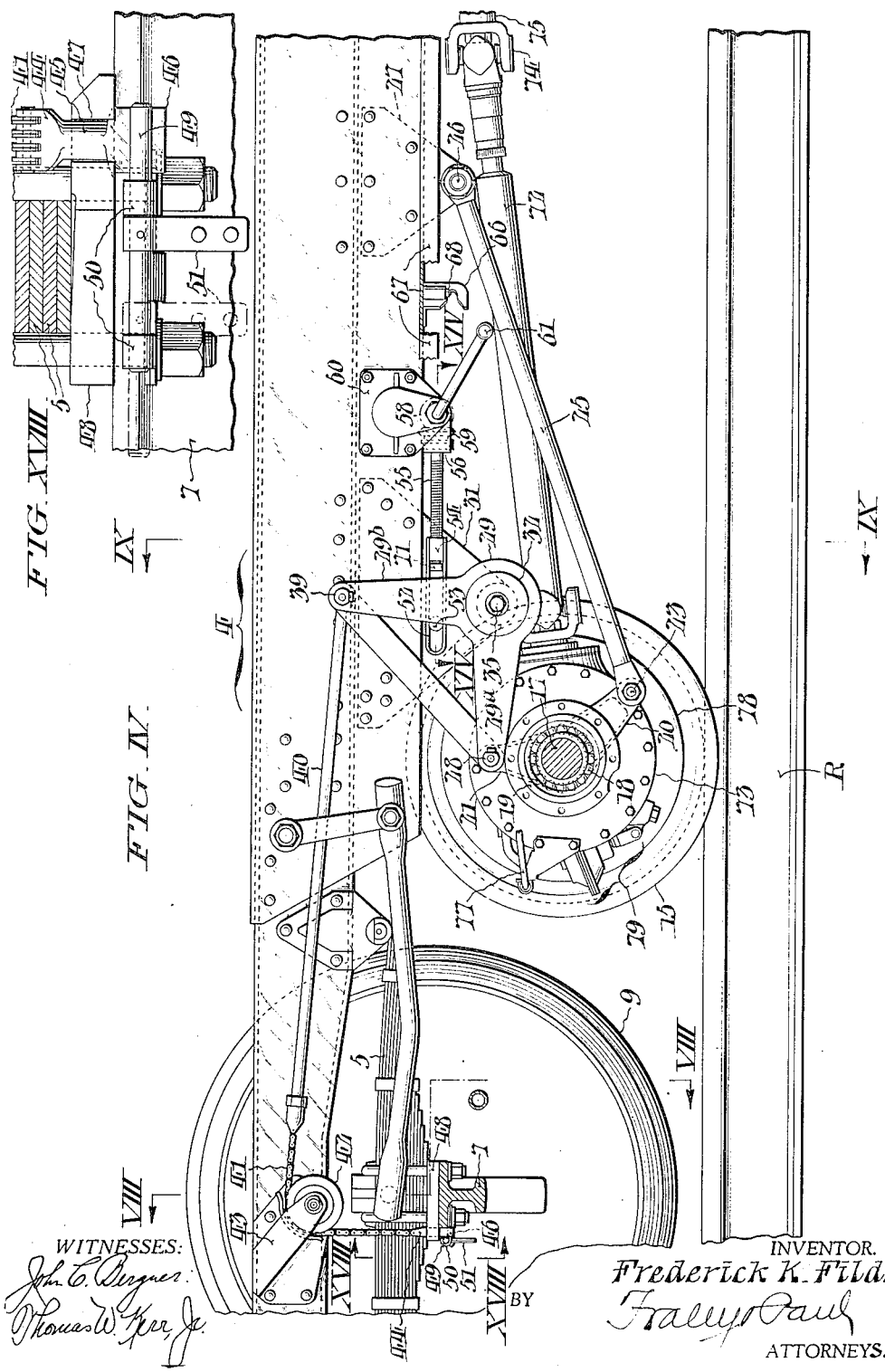

May 9, 1939. F. K. FILDES 2,157,651
ROAD-RAIL VEHICLE
Filed Dec. 3, 1936 13 Sheets-Sheet 6
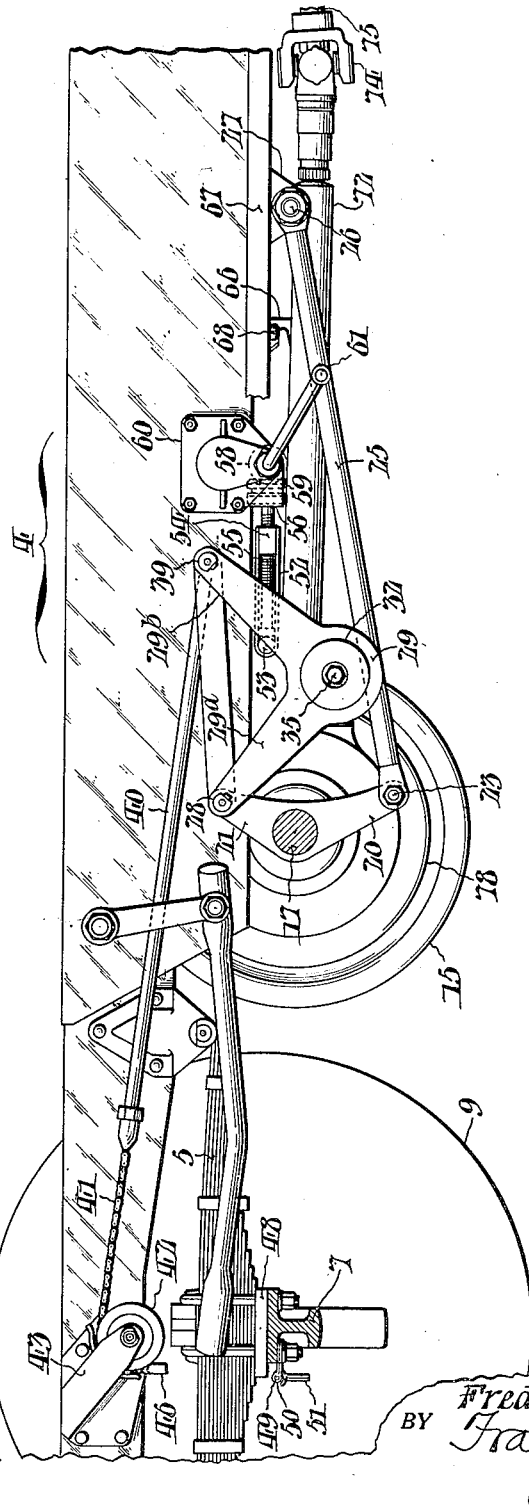

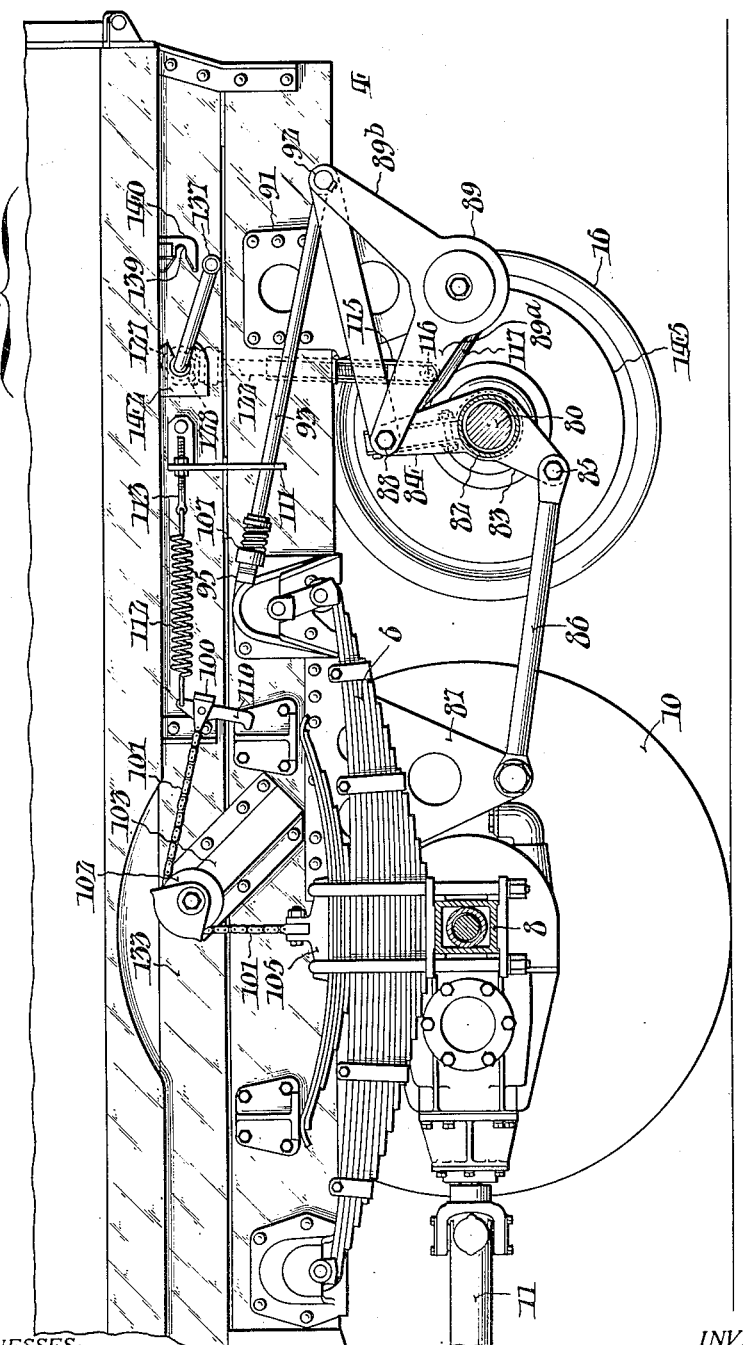

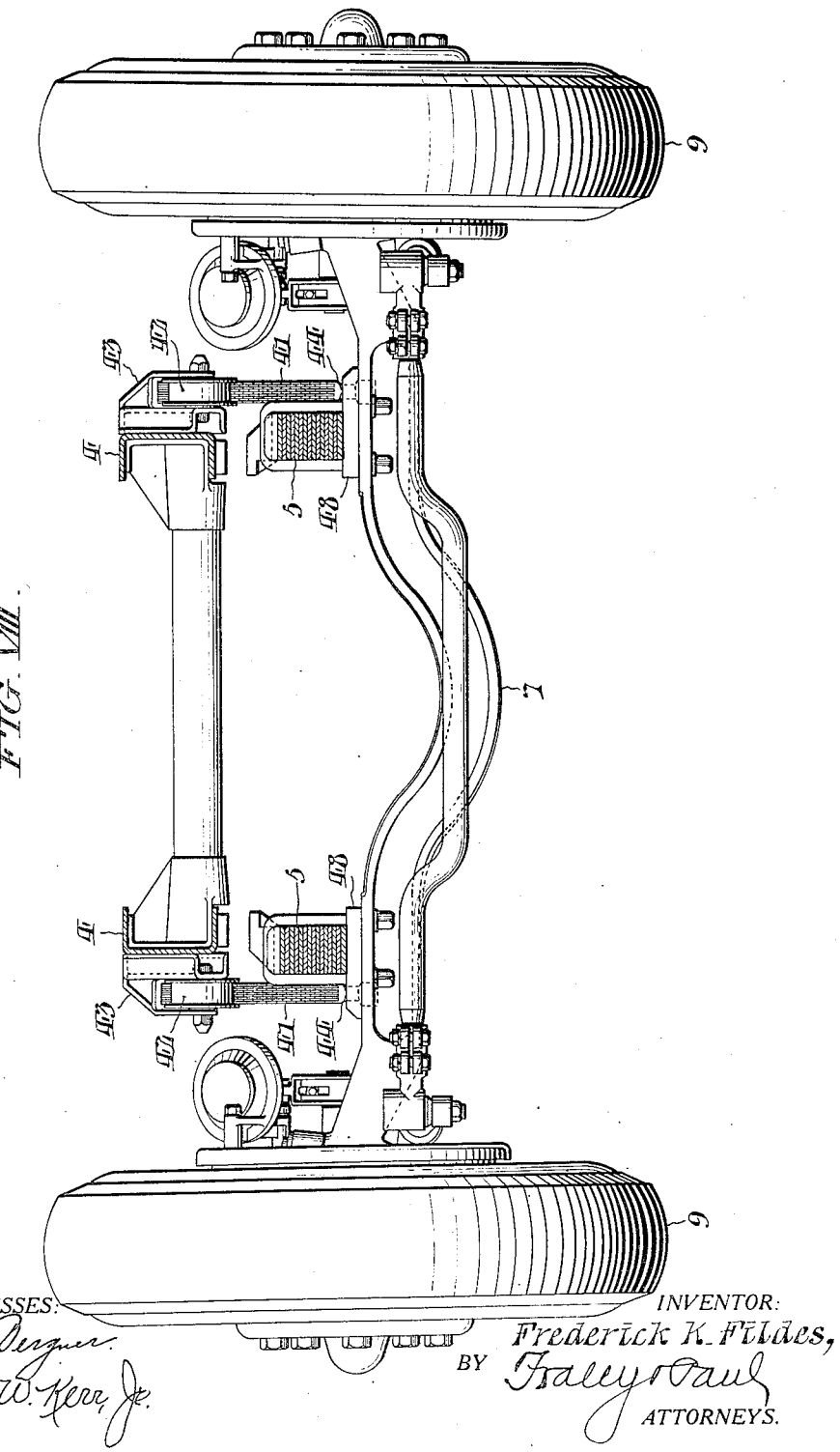

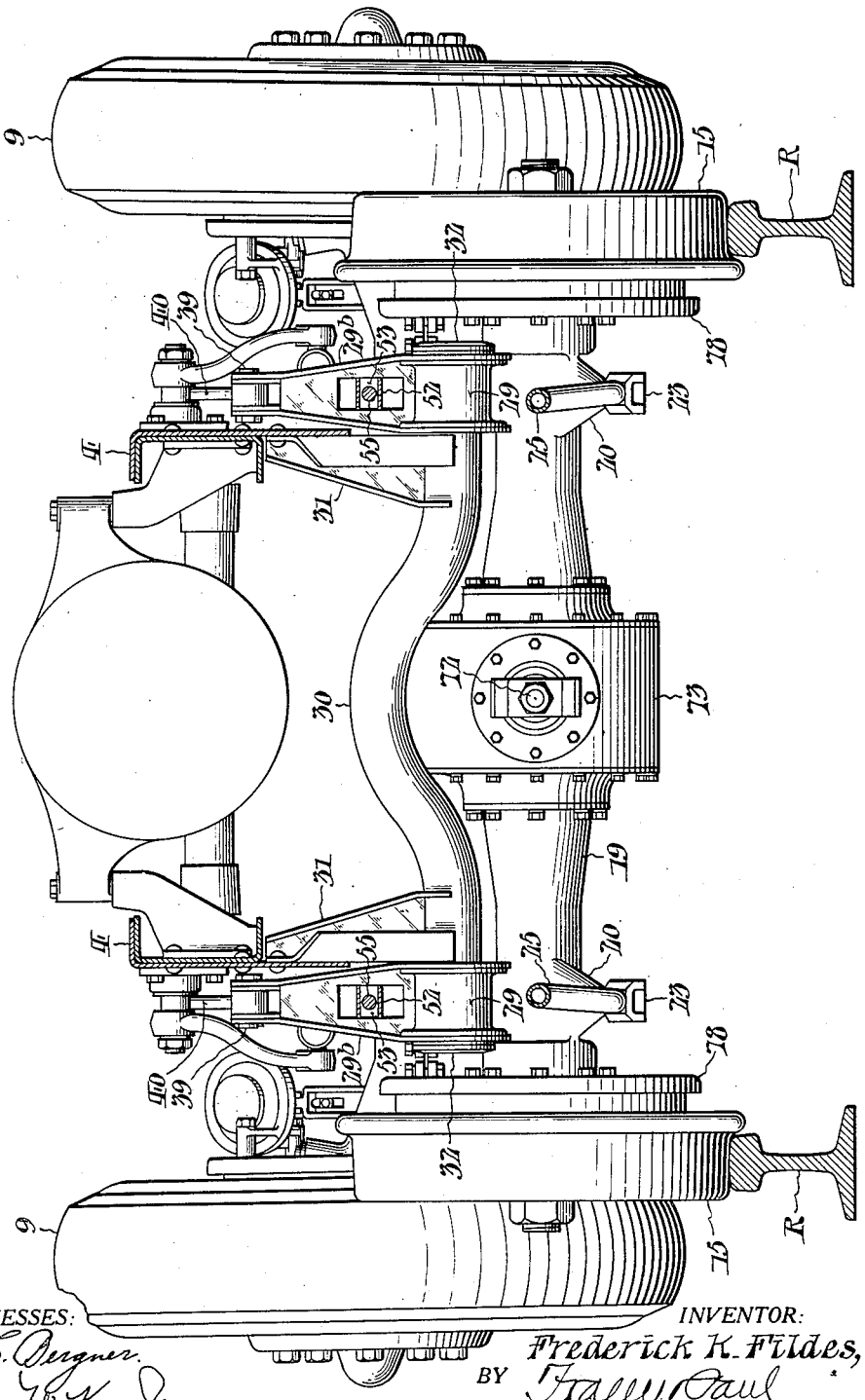

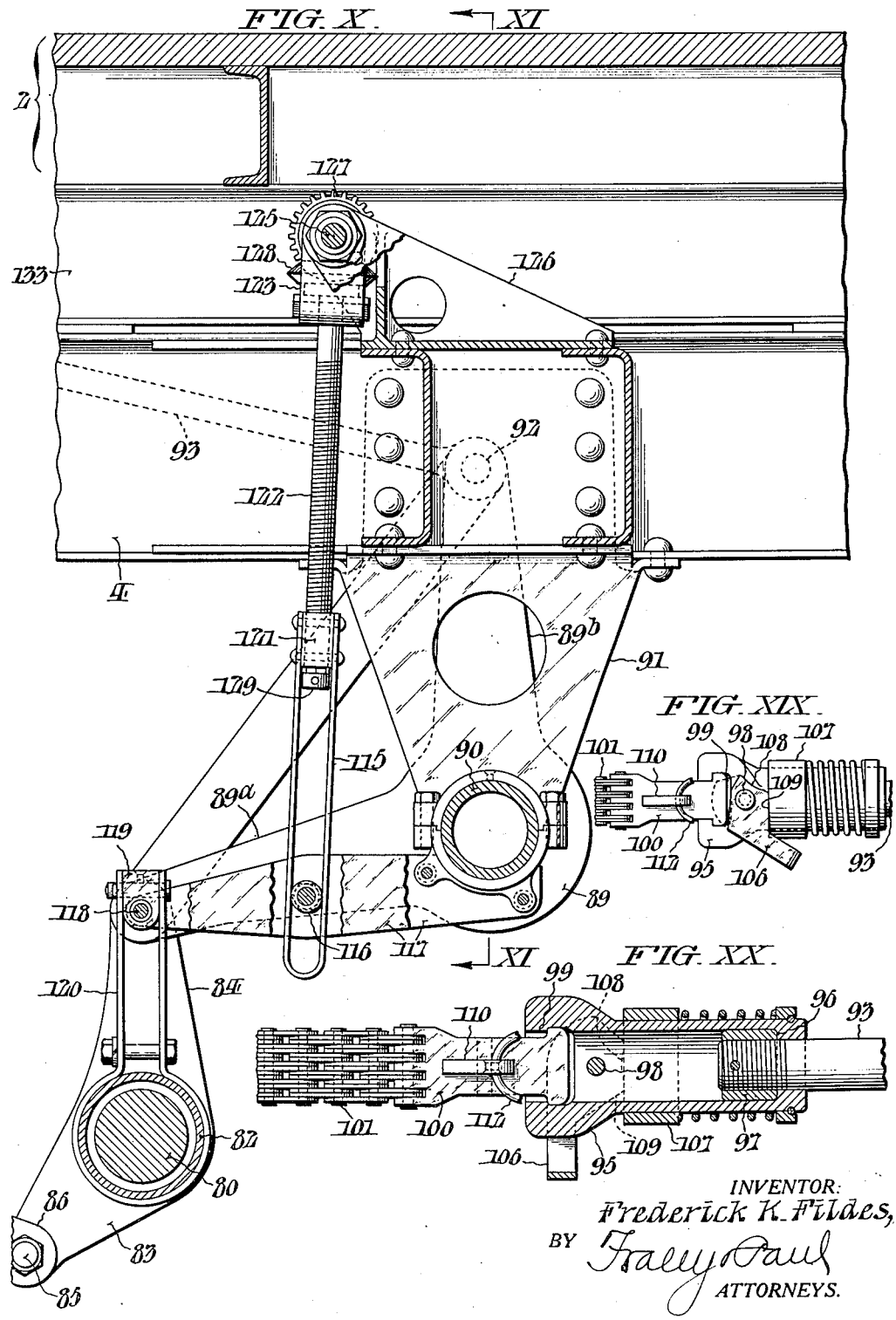

May 9, 1939.　　　　F. K. FILDES　　　　2,157,651
ROAD-RAIL VEHICLE
Filed Dec. 3, 1936　　　13 Sheets-Sheet 11
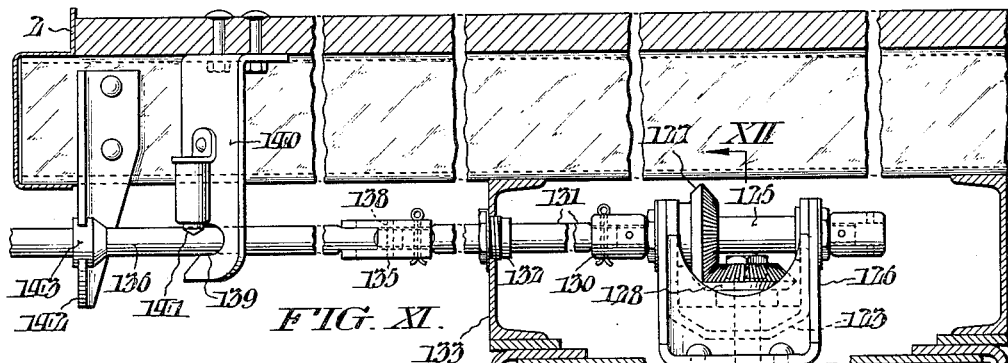
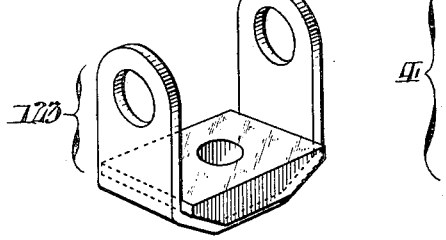
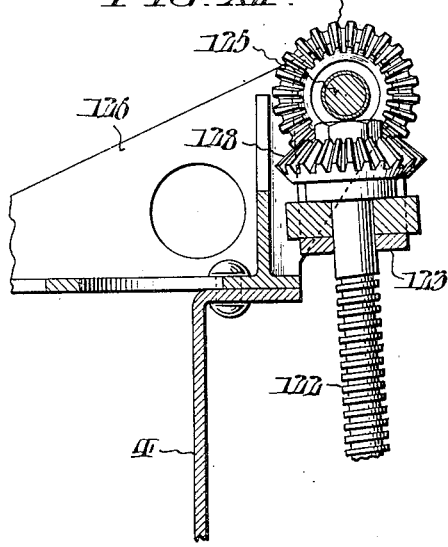
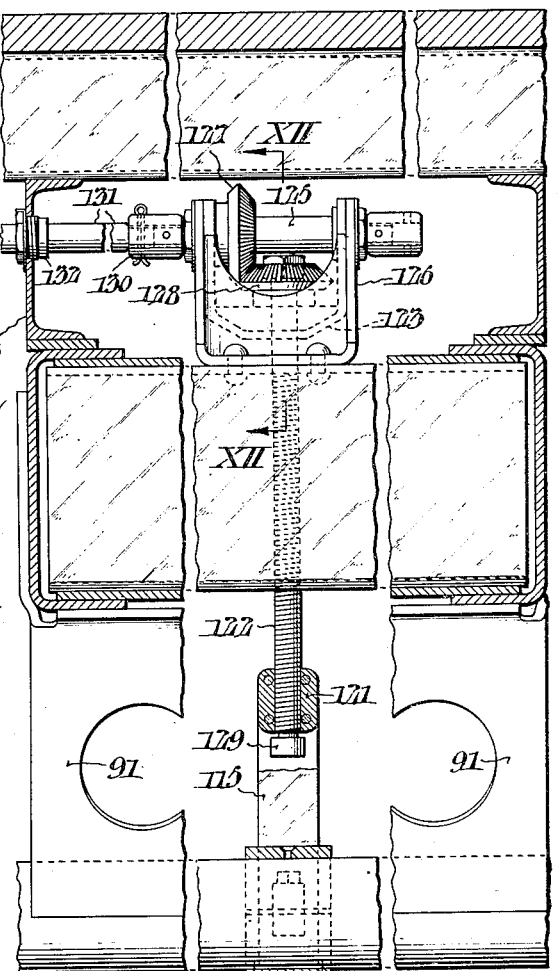
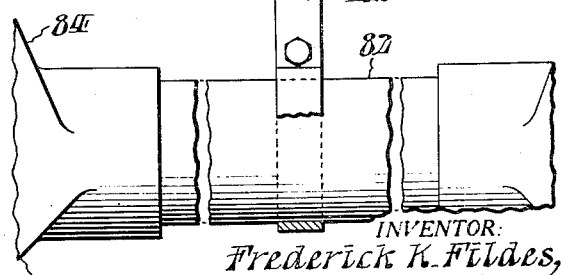
WITNESSES:
John E. Bergner
Thomas W. Kerr, Jr.
INVENTOR:
Frederick K. Fildes,
BY Fraley & Paul
ATTORNEYS.

May 9, 1939.　　　F. K. FILDES　　　2,157,651
ROAD-RAIL VEHICLE
Filed Dec. 3, 1936　　　13 Sheets-Sheet 12
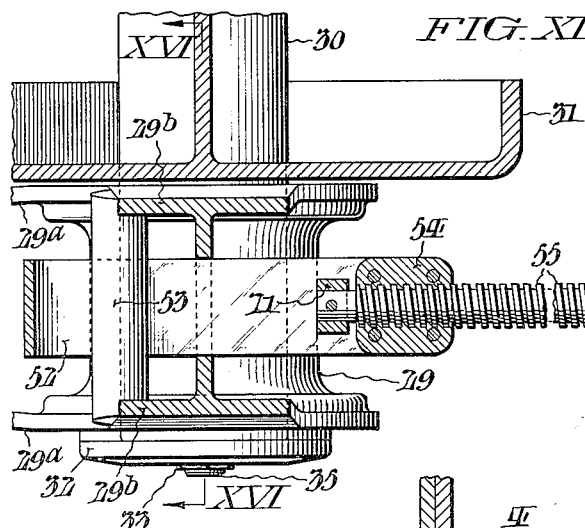
FIG. XIV.
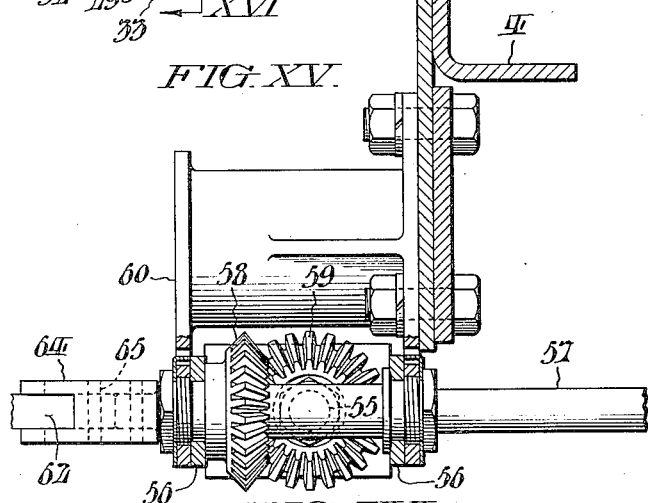
FIG. XV.
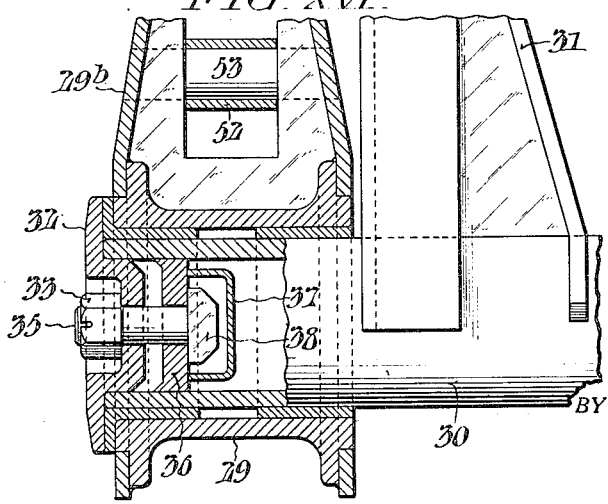
FIG. XVI.
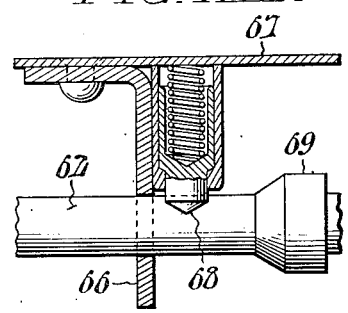
FIG. XVII.
INVENTOR:
Frederick K. Fildes,
BY
ATTORNEYS.

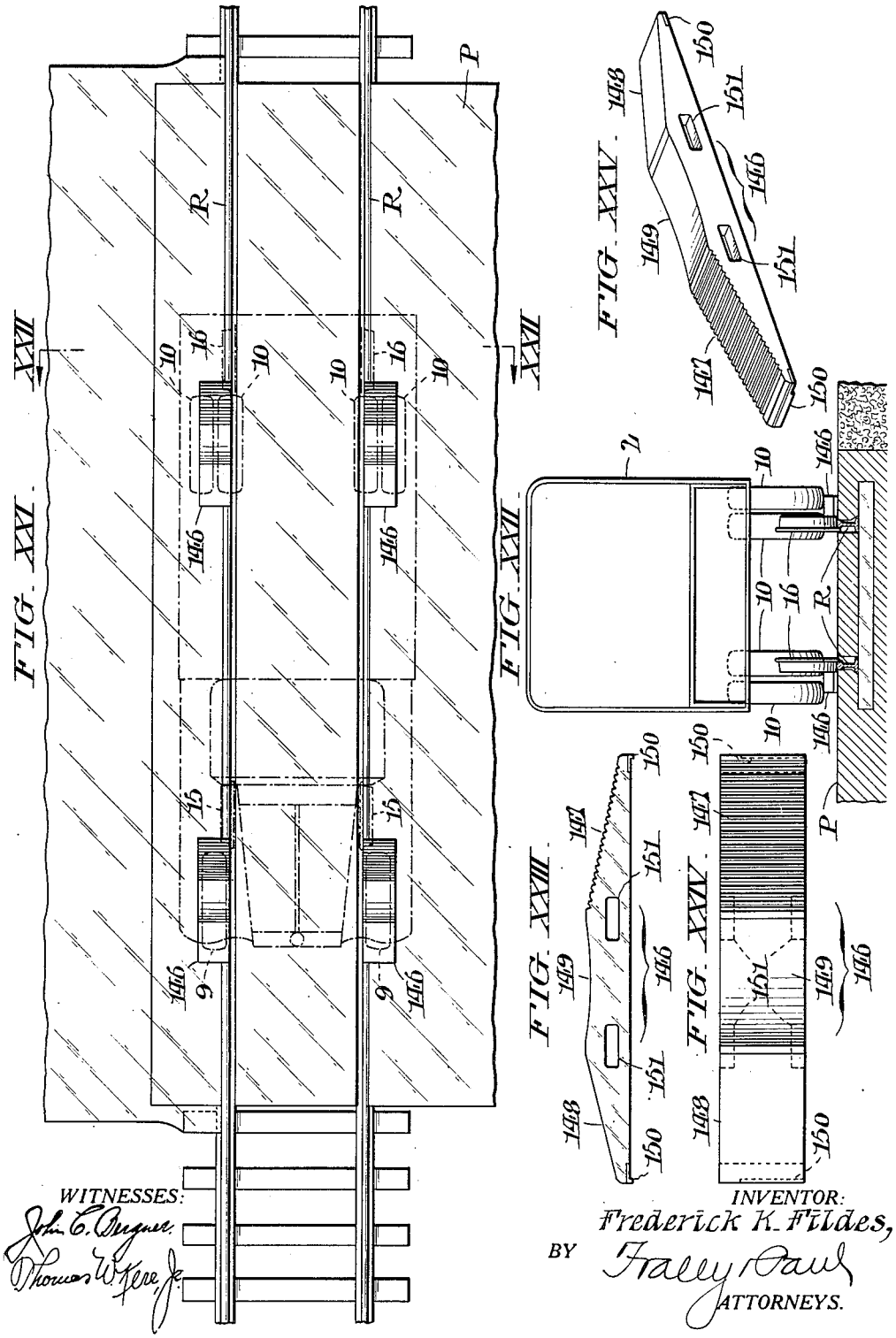

Patented May 9, 1939

2,157,651

UNITED STATES PATENT OFFICE 2,157,651

ROAD-RAIL VEHICLE

Frederick K. Fildes, Altoona, Pa., assignor to The Pennsylvania Railroad Company, Philadelphia, Pa., a corporation of Pennsylvania Application December 3, 1936, Serial No. 113,975

14 Claims. (Cl. 105—215)

This invention relates to road-rail vehicles, that is to say, to vehicles having a set of plain wheels for highway travel, and a set of flanged wheels capable of being used in lieu of the plain wheels for rail travel.

One of the aims of my invention is to enable conversion of the truck of the kind referred to from one condition of use to the other manually without necessitating exertion of any lifting effort on the part of the operator in raising the auxiliary wheels from active position to a normally elevated inactive position.

Another object of my invention is to make possible the employment of the usual springs by which the body of the vehicle is normally supported from the axles of the usual highway wheels, to yieldingly sustain the body when the auxiliary wheels are used in railway travel with the plain wheels elevated.

The foregoing objects I attain in practice, as hereinafter more fully disclosed, through provision of a simple form of articulated suspensions for the auxiliary wheels; through provision of ramp blocks up which the road wheels are run for temporary support at an elevation; through provision of easily operable manual means for letting down the auxiliary wheels from their normally-raised idle position to the rail level while the highway wheels are elevated as aforesaid; through provision of connections in association with the suspensions capable of being coupled with the vehicle springs upon lowering of the auxiliary wheels; and through incorporation of lost motion elements in the suspensions which will permit elevation of the auxiliary wheels by running them onto the ramp blocks when the vehicle is to be subsequently restored to condition for highway use and which, moreover, will permit reverse operation of the letdown or lowering means after elevation of said auxiliary wheels to secure the latter in the normally raised inactive positions.

Other objects and attendant advantages will appear from the following detailed description of the attached drawings, wherein Fig. I shows in side elevation, a motor truck conveniently embodying the present improvements, in condition for rail travel.

Fig. II shows the rear end elevation of the truck with the upper portion of its body removed.

Fig. III is a fragmentary broken out view showing the chassis of the truck in plan.

Fig. IV is a longitudinal sectional elevation of the forward portion of the truck, viewed as indicated by the arrows IV—IV in Fig. III.

Fig. V is a longitudinal sectional elevation of the rear portion of the truck taken as indicated by the arrows V—V in Fig. III.

Figs. VI and VII are views corresponding to Figs. IV and V showing the truck arranged for highway use.

Fig. VIII is a transverse sectional view of the truck chassis taken as indicated by the arrows VIII—VIII in Fig. IV.

Fig. IX is a transverse sectional view of the truck chassis taken as indicated by the arrows IX—IX in Fig. IV.

Fig. X is a detail view in longitudinal section on a larger scale taken as indicated by the arrows X—X in Fig. III.

Fig. XI is a fragmentary cross sectional view taken as indicated by the arrows XI—XI in Fig. X.

Fig. XII is a fragmentary detail sectional view taken as indicated by the arrows XII—XII in Fig. XI.

Fig. XIII is a perspective view of a bearing member forming a part of the lifting mechanism.

Fig. XIV is a fragmentary detail sectional view taken as indicated by the arrows XIV—XIV in Fig. IV.

Figs. XV and XVI are fragmentary detail sectional views taken as indicated by the arrows XV—XV and XVI—XVI in Fig. XIV.

Fig. XVII is a fragmentary detail section view taken as indicated by the arrows XVII—XVII in Fig. III.

Fig. XVIII is a fragmentary detail sectional view taken as indicated by the arrows XVIII—XVIII in Fig. IV.

Fig. XIX is a fragmentary view in plan of a coupling means embodied in one of the suspensions for the auxiliary wheels.

Fig. XX is a longitudinal sectional view of the coupling means taken as indicated by the arrows XX—XX in Fig. V.

Fig. XXI is a view in plan showing how the truck is positioned on a railway siding platform or a highway crossing in readiness to be changed from one condition of use to the other.

Fig. XXII is a sectional view taken as indicated by the arrows XXII—XXII in Fig. XXI.

Fig. XXIII and XXIV, respectively, are a side elevation and a plan view of one of the ramp blocks which I have provided to facilitate the conversions.

Fig. XXV shows the ramp block in perspective.

Figs. XXVI and XXVII are diagrammatic views showing successive steps in converting the truck from condition for rail use to condition for highway use.

For convenience of illustration herein, I have shown my invention as embodied in a maintenance motor truck carrying suitable equipment for making overhead wiring connections and other minor repairs on electric railways. The truck may be generally of standard construction with an elevatable tower 1, and a body 2, both mounted rearward of the driver's cab 3 upon a chassis frame 4 which is supported, with interposition of semi-elliptic leaf springs 5 and 6, upon front and rear axles 7 and 8 respectively carrying, in this instance, plain single front steering wheels 9 and double rear drive wheels 10. During highway travel, power is transmitted to the rear wheels 10, through a propeller shaft 11, from a transmission 12 (Fig. I) as ordinarily. By means of a clutch 13 operable from within the cab 3 the propeller shaft 11 can be disconnected from the transmission 12 when the truck is to be used on rails.

The provisions which I have made whereby a vehicle such as briefly described above may be adapted for travel on track rails R as shown in Figs. I, IV and V include pairs of auxiliary front and rear flanged wheels 15 and 16 respectively located immediately behind the usual steering and drive wheels 9 and 10 and spaced by substantially-corresponding distances from the latter. The axle 17 for the front pair of flanged wheels 15 is journaled in ball bearings 18 (Fig. IV) within an axle housing 19 which is rotatively free on said axle, and which, near its opposite ends, has integrally-formed pairs of projecting radial lugs 20 and 21 in obtuse angular relation. As shown in Fig. IV, the lugs 20 on the axle housing 19 are pivotally connected at 23 to link rods 25 which are fulcrumed for up and down movement at 26 to bearing brackets 27 riveted fast to the chassis frame 4. The other lugs 21 on the axle housing 19 are pivotally connected at 28 to the arms 29a of compositely-formed lifting bell crank levers 29 respectively fulcrumed near the ends of a tubular transverse member 30 which is supported in suspension from the chassis frame 4 by brackets 31. From Fig. XVI, it will be observed that each of the bell cranks 29 is held against lateral shifting on the transverse member 30 through means including a cap 32 which is held in position by a nut 33 at the outer end of an axial screw bolt 35 passing through a cross web 36 within the corresponding end of the transverse member 30. The bolt is retained by a keeper 37 welded or otherwise permanently secured to the web 36 and surrounding the head 38 of said bolt. Pivotally connected at 39 to the arms 29b of the bell crank levers 29 are link rods 40, which are connected to multiple strand chains 41 that pass over and downward about directional pulleys 42 rotative on fixed bearing brackets 43 at the sides of the chassis frame 4. Attached to the free ends of the chains 41 are terminal pieces 44 with shanks 45 and heads 46 capable of being engaged in lateral notches 47 of plates 48 respectively secured between the springs 5 and the front axle 7 of the truck, as shown in Figs. IV and XVIII. When so engaged, the terminal pieces 46 are lockable against accidental displacement by keeper bolts 49 which are slidable in clip guides 50 on the axle 7 and which are provided with manipulating handles 51. Normally when the truck is used on highways, the flanged wheels 15 are held in the idle raised positions shown in Fig. VI by slings 52 which engage cross pins 53 on the arms 29b of the bell cranks 29, see Fig. XIV. As shown, the slings 52 are provided with nut blocks 54 which are engaged by screw spindles 55 having bearings in yokes 56 fulcrumed for pivotal movement on a transverse shaft 57. Keyed to the shaft 57 in the intervals between the extremities of the yokes 56 are miter pinions 58 which mesh with companion miter pinions 59 similarly secured to the contiguous ends of the screw spindles 55. The shaft 57 is journaled in hanger bearings 60 attached to the sides of the chassis frame 4 and is provided at its opposite ends with operating crank handles 61. The shanks 62 of the crank handles 61 have polygonal ends 63 which are insertable into socket collars 64 on the shaft 57 as shown in Fig. XIV, and have slot and pivot connections 65 with said collars. Accordingly it is possible to disengage the handle shanks 62 from the sockets of the collars 64 and to swing the handles 61 back out of the way for support by notched suspension brackets 66 affixed to the running boards 67 of the truck. Spring pressed keeper pins 68 serve to yieldingly retain the handles 61 within the brackets 66, see Fig. XVII. When in operating position, the crank handles 62 are given additional journal support through engagement of collars 69 on their shanks 62 in laterally-notched supplemental hanger bearings 70 on the running boards 67. As shown in Fig. XIV, stop collars 71 on the spindles 55 are relied upon to prevent the nut blocks 54 of the strap members 52 from running completely off said spindles. The front auxiliary wheels 15 are arranged to be driven by a propeller shaft 72, which, at one end extends into a casing 73 medially of the axle housing 19 containing forward and reverse drive gearing (not shown), and which, at its other end has a universal connection 74 with a shaft 75 of the transmission 12. By means of a clutch 76 (Fig. I) operable from within the driver's cab 3, the propeller shaft 72 for the auxiliary wheels 15 may be disconnected from the transmission shaft 75 when the truck is to be used on highways. The reverse gearing within the casing 73 is likewise operable, through connections partly shown at 77 in Figs. III and IV from within the driver's cab 3. The wheels 15 are provided with individually-associated brake drums 78 with pneumatic actuating means therefor such as shown at 79 in Fig. IV capable of being operated, through suitable connections (not illustrated) from the driver's cab 3. The design and arrangement of the drive means, just described, for the forward pair of flanged wheels 15 is advantageous in that it favors ready and economic adaptation, to the purposes of my invention, of a motor truck which is otherwise of standard construction.

Generally similar suspensions are provided for the rear auxiliary wheels 16 these being shown in Figs. I, II, III, V, VII, and X—XX. The axle 80 carrying the auxiliary wheels 16 is journaled in ball bearings 81 within a tubular housing 82 which is rotatably free on said axle, and which has at its opposite ends, pairs of circumferentially spaced radial lugs 83 and 84. As shown, the lugs 83 have pivotal connections 85 with radius rods 86 which are fulcrumed on fixed hanger brackets 87 pendant from the chassis frame 4. The other lugs 84 of the axle housing 82 are pivotally connected at 88 to corresponding arms 89a of compositely formed bell crank levers 89 which are freely fulcrumed on the ends of a tubular cross member 90 supported in suspension beneath the chassis frame 4 by brackets 91. Pivotally connected at 92 to the arms 89b of the bell cranks 89 are link rods 93 which are provided at their free ends with sleeve-like coupling members 95. As shown in Figs. XIX and XX, these coupling members 95 have capacity for independent axial movement within limits prescribed on the one hand by coaction between internal shoulders 96 with nut heads 97 on the rods 93 and on the other hand by coaction of cross pins 98 with the rod ends. Engageable with undercut vertically transverse notches 99 in the coupling members 95, see Fig. V, are complemental terminal members 100 at the free ends of multi-strand chains 101 which pass forwardly over and then downwardly about directional pulleys 102 rotative on fixed brackets 103 respectively at opposite sides of the chassis frame 4, and which at their other ends are respectively connected to the upper center clamp blocks 105 of the rear springs 6 of the truck. Keeper clips 106 (Fig. XIX) prevent accidental disconnection of the chains 101 from the rods 93, said clips being pivoted on the cross pins 98 of the coupling members 95. Upon swinging the clips 106 to the position shown in Fig. XIX, it is possible to withdraw the coupling members 100 on the chains 101 upwardly out of the notches 99 of the coupling members 95 on the rods 93. Spring pressed collars 107 on the coupling members 95 cooperate with the edges 108 and 109 of the keeper clips 106 to yieldingly hold the latter in their active and retracted positions respectively. In order to facilitate the coupling and uncoupling of the rods 93 and the chains 101, the coupling members 130 are provided with handles 110. When uncoupled as in Fig. VII, each rod 93 is supported in vertically-slotted brackets 111 at the corresponding side of the chassis frame, and each chain 101 by a tension spring 112 connected at one end to a handle 110 on the coupling member 100 and at the other end to an eye bolt 113 adjustable in the bracket 111.

The lowering mechanism for the auxiliary rear wheels 16 includes a vertical sling 115 in engagement with a cross pin 116 on a compositely formed lever arm 117 which is freely fulcrumed centrally of the tubular transverse member 90, see Figs. II, III and X, and connected at 118 to a swivel block 119 at the end of a compositely-formed clamp arm 120 centrally of the axle housing 82. The nut block 121 of the strap 115 is engaged by a screw spindle 122, which, at its upper end is journaled centrally of a yoke piece 123 whereof the side arms are fulcrumed on a transverse operating shaft 125. As shown in Figs. III, X, XI and XII, the shaft 125 is journaled in a bearing bracket 126 on the chassis 4 and carries a miter gear pinion 127 in mesh with a companion miter pinion 128 at the upper end of the screw spindle 122. A head 129 at the bottom end of the screw spindle 122 prevents the sling 115 from running entirely off said spindle. Connected to the shaft 125 by a coupling collar 130 is an extension 131 which passes through a bearing 132 in a channel bar 133 of the chassis 4, and which at its outer end carries a socket head 135 adapted to receive the polygonal end of the shank 136 of an actuating crank handle 137. As shown in Fig. III the handle shank 136 has a pin and slot connection 138 with the socket head 135 on the shaft extension 131 so that it can be uncoupled and swung rearwardly out of the way to a retracted position as shown in dot and dash lines, into engagement with the lateral notch 139 of the suspension bracket 140 pendant from the truck body 2 in which it is releasably held by a spring pressed keeper pin 141. Another laterally notched suspension bracket 142 is provided on the truck body to receive a coned collar 143 on the shank 136 of the handle 137 so as to support the latter in its operative position as shown in full lines in Figs. III and XI. Preferably, the rear auxiliary wheels 16 are provided, like the front auxiliary wheels 15 with brake drums 145 and pneumatic operating means therefor, such as shown at 146 (Fig. V) which operating means is controllable, through suitable interposed connections (not illustrated) from the driver's cab 3.

During highway travel, with the auxiliary wheels 15 and 16 raised as in Figs. VI and VII and with the propeller shaft 11 connected by the clutch 13 with the transmission 12, the truck is operated in the usual well known way.

In order to facilitate change of the truck from one condition of use to the other, as presently explained, I have further provided, in accordance with my invention, ramp blocks such as shown in detail at 146 in Figs. XXIII–XXV with rises 147, 148 leading to a concaved central high portion 149, one of the rises being in this instance, roughened or corrugated as illustrated. At opposite ends, the ramp block 146 is provided with downward anti-slip projections 150, and at opposite sides with hand recesses 151 for convenience of lifting them. A set of four of the ramp blocks 146 is required, these being carried about in the truck.

When the truck is to be prepared for rail travel, it is driven onto a highway crossing or siding platform such as indicated at P in Figs. XXI and XXII, level with the tops of the rails R, and centrally aligned horizontally relative to the railway track. With this preparation, the four ramp blocks 146 are placed immediately ahead of the wheels 9 and 10 with their corrugated rises rearmost and their inner sides flush with the inner sides of the rails R, and said wheels run up to central position on the blocks as shown in Figs. XXI, XXII and XXVI. During the step just described, the blocks 146 are held from slipping by biting of their end projections 150 into the top surface of the platform. The auxiliary wheels 15 and 16 are thereupon lowered, through operation of the slings 52 and 115 by means of the crank handles 61 and 137, until they rest on the rails as shown in Figs. XXII and XXVI, this action being permitted by virtue of rotative freedom of the housings 19 and 82 on the axles 17 and 80. The chains 41 are next coupled with the front axles 7 and the link rods 93 with the chains 101, and the truck backed to clear the wheels 9 and 10 and permit removal of the blocks 146, after which the clutch 13 is disconnected and the clutch 76 connected. As a consequence of this procedure, the load is transferred to the auxiliary wheels 15, 16 with the wheels 9 and 10 clear of the rails, so that during rail use, the shocks of travel are absorbed by the springs 5 and 6 through upward pull upon them by the chains 41 and 101 associated with the auxiliary wheel suspensions. In this connection, it will be noted that due to the arrangement of the flanged wheels 15 and 16 in respect to the plain wheels 9 and 10, transmission from highway to rail use of the vehicle is effected without change of the wheel base.

To restore the truck to condition for highway travel, the truck is stopped on a crossing or siding platform P and the wheels 9 and 10 run up the ramp blocks 146 as before, to the position shown in Fig. XXVI. The chains 41 are then disconnected from the front axle 7 and the chains 101 uncoupled from the link rods 93; the clutch 76 disconnected; and the clutch 13 connected. The truck is thereupon advanced slightly to run the auxiliary wheels 15 and 16 up the ramp blocks 146 to the position shown in Fig. XXVII. Finally, the crank handles 61 and 137 are reversely operated to draw up upon the slings 52 and 115 incident to which the tubular housings 19 and 82 rotate about the axles 17 and 80 as before for support of the auxiliary wheels 15 and 16 in their normal raised inoperative position; and the truck advanced slightly from the position of Fig. XXVII to clear the ramp blocks 146 and permit their removal.

Thus, from the foregoing it will be apparent that my improved road-rail truck is easily and quickly convertible from one condition of use to the other without necessitating exertion of any lifting effort whatever on the part of the operator.

Having thus described my invention, I claim:

1. In a road-rail vehicle, a chassis frame and body supported, with interposition of springs by front and rear wheels for highway use; flanged auxiliary front and rear wheels for rail use; articulated suspensions normally disconnected from the springs and permitting lowering of the auxiliary wheels from a normally inactive position to active position to support the load in lieu of the highway wheels; and means whereby the auxiliary wheel suspensions can be connected to the springs for absorption of travel shocks incident to rail use of the vehicle.

2. In a road-rail vehicle, a chassis frame and body supported, with interposition of springs, by front and rear wheels for highway use; flanged auxiliary front and rear wheels for rail use; articulated suspensions normally disconnected from the springs and permitting lowering of the auxiliary wheels from a normally inactive raised position to active position to support the load in lieu of the highway wheels; means whereby the auxiliary wheel suspensions can be connected with the springs for absorption of travel shocks incident to rail use of the vehicle; power means; and a clutch means whereby one set of the highway wheels and one set of auxiliary wheels may be selectively coupled with the power means.

3. In a road-rail vehicle, a chassis frame and body supported, with interposition of semi-elliptic springs, by front and rear wheels for highway use; flanged auxiliary front and rear wheels for rail use; articulated suspensions normally disconnected from the springs and permitting lowering of the auxiliary wheels from a normally inactive raised position to active position to support the load in lieu of the highway wheels; and means whereby the auxiliary wheel suspensions can be coupled with the elliptic springs for upward pull upon the latter to absorb the shocks of travel incident to rail use of the vehicle.

4. In a road rail vehicle, a chassis frame; pairs of front and rear wheels for highway use; pairs of front and rear auxiliary flanged wheels for rail use carried by separate axles; individual axle journal housings rotatively free on said axles; individual suspensions for the pairs of auxiliary wheels, each including a radius rod fulcrumed at one end to the chassis frame and pivotally connected at its other end to the auxiliary wheel axle housing, and a supporting lever fulcrumed on the chassis frame and pivotally connected at its end to the axle housing; means cooperative with the levers of each suspension to normally hold the auxiliary wheels in a raised inactive position; means whereby the auxiliary wheels can be lowered to active position for use in lieu of the highway wheels in rail travel; and means for securing the suspensions with the auxiliary wheels in active lowered position.

5. In a road rail vehicle, a chassis frame; pairs of front and rear wheels for highway use; pairs of front and rear auxiliary flanged wheels for rail use carried by separate axles; individual axle journal housings rotatively free on said axles; individual suspensions for the pairs of auxiliary wheels, each including a radius rod fulcrumed at one end to the chassis frame and pivotally connected at its other end to the auxiliary wheel axle housing, and a supporting lever fulcrumed on the chassis frame and pivotally connected at its end to the axle housing; a sling engaging the lever of each suspension to normally hold the auxiliary wheels in a raised inactive position; crank-operated screw means whereby the slings may be actuated to let down the auxiliary wheels to active position for use in lieu of the highway wheels in rail travel; and means for securing the suspensions with the auxiliary wheels in active position.

6. In a road rail vehicle, a chassis frame; pairs of front and rear wheels for highway use; pairs of front and rear auxiliary flanged wheels for rail use carried by separate axles; individual axle journal housings rotatively free on said axles; individual suspensions for the pairs of auxiliary wheels, each including a radius rod fulcrumed at one end to the chassis frame and pivotally connected at its other end to the auxiliary wheel axle housing; a bell crank fulcrumed on the chassis frame with one of its arms pivotally connected to and supporting the auxiliary wheel axle housing; means cooperative with the bell crank to normally hold the auxiliary wheels in a raised inactive position; means whereby the auxiliary wheels can be lowered to active position for use in lieu of the highway wheels in rail travel; and releasable means coordinated with the other arm of each bell crank lever for securing the suspensions with the auxiliary wheels in active lowered position.

7. In a road-rail vehicle, a chassis frame supported, with interposition of springs, by pairs of front and rear wheels for highway use; pairs of auxiliary front and rear flanged wheels for rail use carried by separate axles; individual suspensions for the pairs of auxiliary wheels normally disconnected from the springs aforesaid each including an axle journal housing rotatively free on the axle, a radius rod fulcrumed at one end on the chassis frame and pivotally connected at its other end to the auxiliary wheel axle housing, and a bell crank fulcrumed on the chassis frame with one of its arms pivotally connected to and supporting the axle housing; means coordinated with each bell crank to normally hold the auxiliary wheels in a raised inactive position; means whereby the auxiliary wheels can be lowered to active position for use in lieu of the highway wheels in rail travel; and means whereby the other arms of the bell cranks can be connected to the springs aforesaid for transmission to the latter of the shocks encountered by the auxiliary wheels in rail travel.

8. In a road-rail vehicle, a chassis frame and body supported, with interposition of springs, by pairs of front and rear wheels for highway use; pairs of flanged auxiliary front and rear wheels for rail use mounted on separate axles; bearing housings for the auxiliary wheel axles rotatively free on said axles and having pairs of circumferentially spaced projecting radial lugs; a suspension for each auxiliary wheel axle including a radius rod fulcrumed at one end on the chassis frame and pivotally connected at its other end to one of the lugs at the corresponding auxiliary wheel axle housing, a bell crank fulcrumed on the chassis frame with one arm thereof pivotally connected to the other lug of the corresponding auxiliary wheel axle housing; means cooperating with each bell crank lever to normally hold the auxiliary axle housing in elevated position with the flanged wheels clear of the highway; manually-operable means whereby the holding means may be actuated to let down the auxiliary wheels from the normally raised position to active position for use in lieu of the highway wheels in rail travel; and means whereby the bell crank levers can be coupled with the springs aforesaid for absorption of the shocks encountered by the flanged wheels in rail travel.

9. In a road-rail vehicle, a chassis frame and body supported, with interposition of springs, by pairs of front and rear wheels for highway use; pairs of auxiliary flanged front and rear wheels for rail use mounted on separate axles; auxiliary wheel axle bearing housings rotatively free on said axles having pairs of circumferentially spaced projecting radial lugs; a suspension for each auxiliary wheel axle including a radius rod fulcrumed at one end on the chassis frame and pivotally connected at its other end to one of the lugs of the corresponding auxiliary wheel axle housing, and a bell crank fulcrumed on the chassis frame with one arm thereof pivotally connected to the other lug of the corresponding auxiliary wheel axle housing; a sling for each bell crank lever for normally holding the bell crank lever and auxiliary axle housing in elevated position on the frame with the flanged wheels clear of the highway; manually-operable means whereby the slings can be actuated to let down the auxiliary wheels under gravitational influence for use in lieu of the highway wheels in rail travel; ramp blocks onto which the highway wheels are adapted to be run when the vehicle is to be converted from one condition of use to the other and onto which the auxiliary wheels are adapted to be run to elevate them to their normal raised position on the frame incident to conversion of the vehicle from rail to highway use and to permit them to be so secured by reverse operation of the holding slings aforesaid; and means whereby, upon lowering of the auxiliary wheel axle housings, the other arms of the bell cranks can be coupled with the springs for communication to the latter through the suspensions, of the shocks encountered by the auxiliary wheels incident to rail travel.

10. In a road-rail vehicle, a chassis frame supported, with interposition of semi-elliptic springs, by pairs of front and rear wheels for highway use; pairs of auxiliary front and rear flanged wheels for rail use; individual suspensions for the auxiliary wheels normally disconnected from the springs, each including an auxiliary wheel axle housing rotatively free on the axle, a radius rod fulcrumed at one end on the chassis frame and pivotally connected at its other end to the auxiliary wheel axle housing, and a bell crank with one of its arms pivotally connected to and supporting the axle housing; means coordinated with the bell crank to normally hold the auxiliary wheels in a raised inactive position; means whereby the auxiliary wheels can be lowered to active position for use in lieu of the highway wheels in rail travel; and means coordinated with the other arms of the bell cranks whereby the shocks encountered by the auxiliary wheels in rail travel are communicated, by upward pull, to said springs.

11. The combination with a road rail vehicle according to claim 1, of ramp blocks adapted to be placed alongside the rails of a railway track, on a platform higher than the tops of said rails, and onto which blocks the highway wheels are adapted to be run, so that the springs are maintained in compression to make possible the connection to them of the articulated suspensions after the flanged wheels have been lowered into engagement with the rails.

12. A road rail vehicle according to claim 1, wherein the axles of the auxiliary wheels are spaced longitudinally of the vehicle by a distance corresponding to the spacing of the plain wheel axles.

13. A road rail vehicle according to claim 1, wherein the axles of the auxiliary wheels are respectively disposed at equal distances rearward of the plain wheel axles.

14. In a road rail vehicle, a chassis frame, pairs of plain front and rear wheels for highway use; pairs of front and rear flanged auxiliary wheels respectively rearward of the pairs of plain wheels, for rail use; means for normally holding the auxiliary wheels elevated during road travel; means whereby the auxiliary wheels may be lowered to support the vehicle in lieu of the plain wheels for rail travel; a centrally located power plant with a transmission casing; a drive shaft extending forwardly from the transmission casing to the flanged wheels at the front end of the vehicle; a drive shaft extending rearwardly from the transmission casing to the plain wheels at the rear of the vehicle; and clutch means whereby the respective power shafts may be selectively connected or disconnected from the transmission.

FREDERICK K. FILDES.